United States Patent [19]

Sollich

[11] 4,059,047

[45] Nov. 22, 1977

[54] CONDITIONING MACHINE FOR CHOCOLATE MASSES

[75] Inventor: Helmut Sollich, Albernbere, Germany

[73] Assignee: Sollich KG, Germany

[21] Appl. No.: 707,094

[22] Filed: July 20, 1976

[30] Foreign Application Priority Data

Aug. 13, 1975 Germany .............................. 2536063

[51] Int. Cl.² ........................... A23C 3/04; F25C 1/14
[52] U.S. Cl. ........................................ 99/455; 62/354
[58] Field of Search ................. 99/452, 455, 460, 462, 99/470, 484; 426/519, 524, 660, 631; 15/246.5, 93; 210/396; 62/354, 381; 165/94

[56] References Cited

U.S. PATENT DOCUMENTS

| 1,375,210 | 4/1921 | Clayton | 165/94 |
| 2,519,645 | 8/1950 | Gilbert | 15/236 |
| 2,677,942 | 5/1954 | Schott | 99/455 |
| 3,770,252 | 11/1973 | Gordini | 165/94 |

Primary Examiner—Leonard D. Christian
Assistant Examiner—Robert Pous
Attorney, Agent, or Firm—Browdy and Neimark

[57] ABSTRACT

A conditioning machine for chocolate masses wherein a pump forces the mass through a stack of cooling stages forming a cylinder, each having cooled top and bottom walls connected to a coolant recirculating system, each stage containing scrapers revolving about the cylinder axis for continuously detaching the mass from the cooling surfaces, each stage having two scrapers axially urged apart by an interposed spring.

4 Claims, 10 Drawing Figures

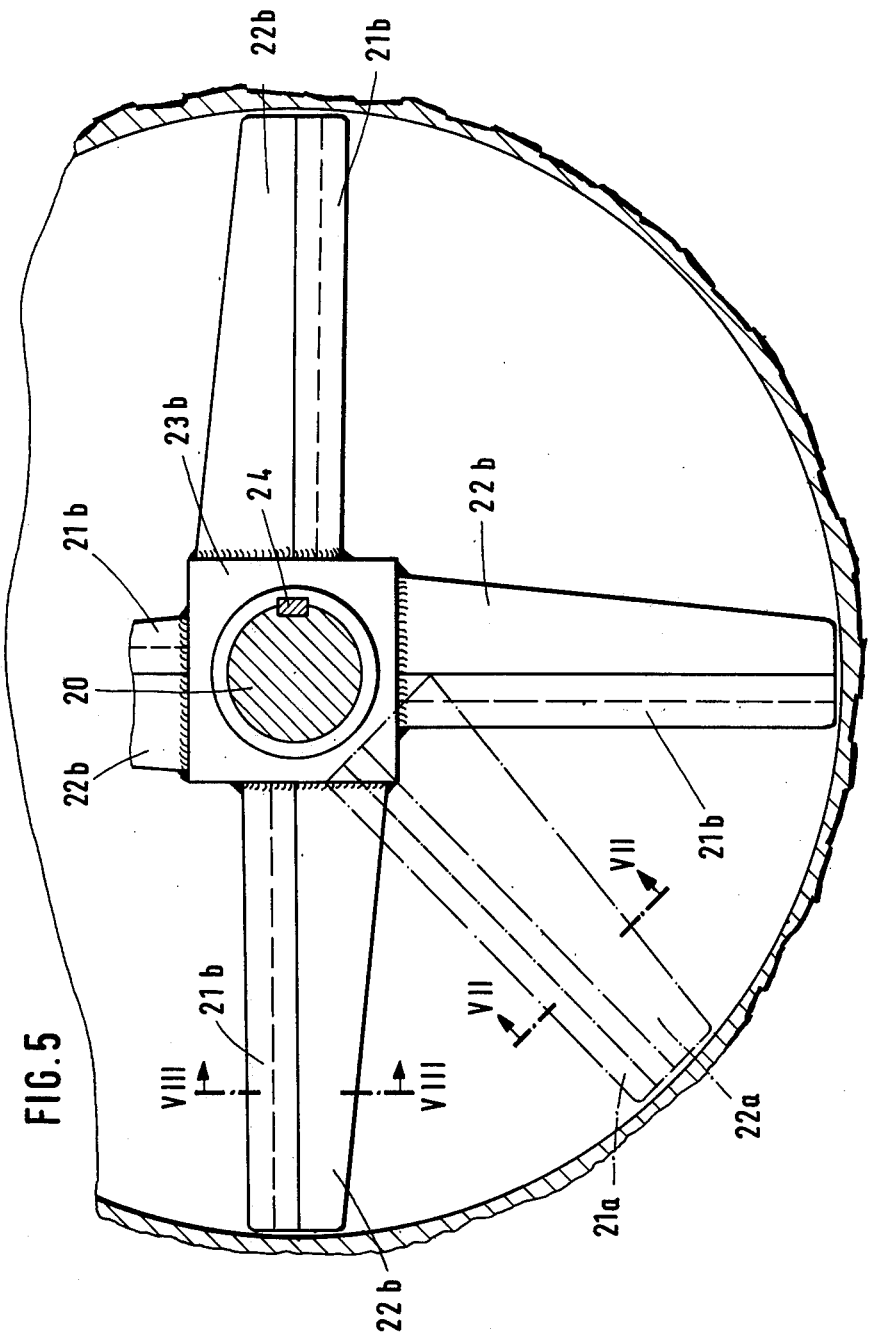

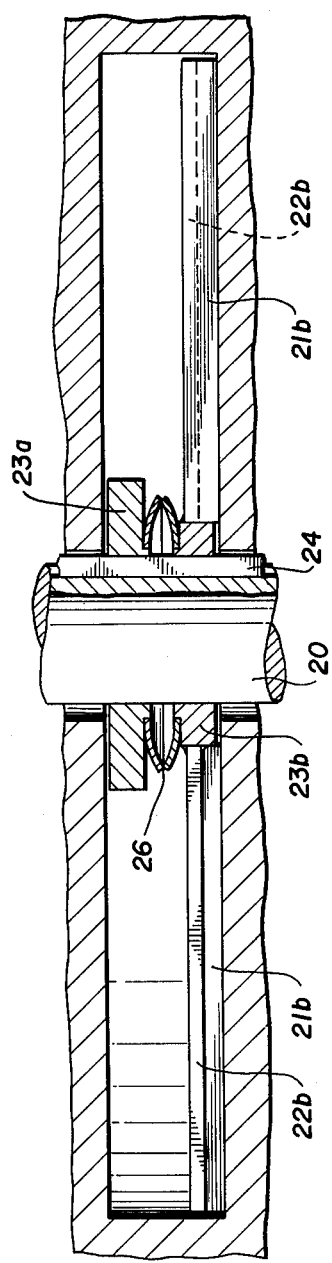

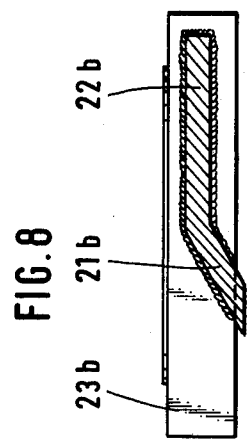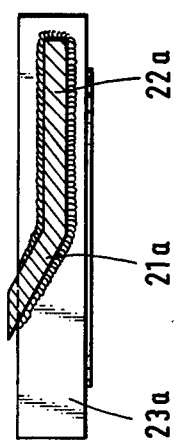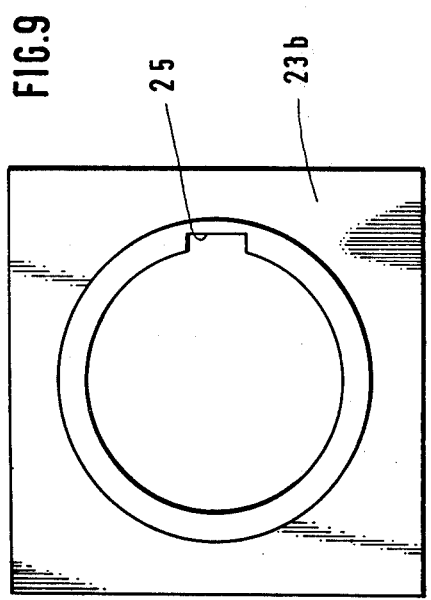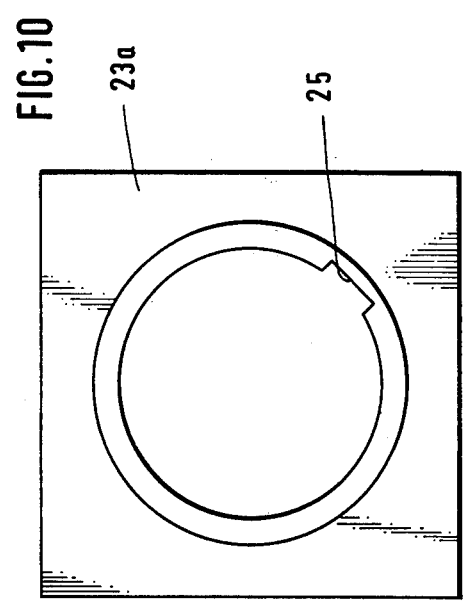

CONDITIONING MACHINE FOR CHOCOLATE MASSES

FIELD OF THE INVENTION

The invention relates to a conditioning machine for masses used in the confectionery manufacturing industry and containing fats, particularly chocolate masses.

BACKGROUND OF THE INVENTION

After leaving the conches such masses must be cooled and conditioned to bring them to the best possible state for further processing. For this purpose use is made of conditioning machines comprising a stack of cooling stages forming a cylinder and each having cooled top and bottom walls connected to a coolant recirculating system, and a pump forcing the mass through all the stages of which each contains scrapers revolving about the cylinder axis. The defect of such machines is their relatively poor throughput and the long time of cooling needed for conditioning the chocolate mass.

SUMMARY OF THE INVENTION

It is therefore an object of the present invention to provide a conditioning machine which permits the cooling time to be minimised and a high performance to be achieved.

According to the invention this is attained by providing in each stage two rotating scraper devices which are urged axially apart by an interposed spring, and which carry scrapers that sweep the top and bottom surfaces of the stage. These spring-loaded scrapers or strippers in each cooling stage continually clean off the cooling surfaces and cause the detached mass to be thoroughly remixed. Consequently only very tiny crystal agglomerates (microcrystals) can form on the cooling surfaces, and as a result of the simultaneous and subsequent intense commixture these will then be present in the precrystallised mass in homogeneous distribution in the form of seed crystals. This is a precondition for achieving a short cooling time, a satisfactory shelf life of the finished confection made from this chocolate mass and for a fine-grained snapping fracture of the product.

With particular advantage the arrangement may be such that the rotating scraper devices comprise arms radiating from a hub mounted on a drive shaft each arm carrying a scraper or being itself modified to form a scraper. The hubs of the scraper devices are preferably axially shiftably mounted on their drive shaft. The spring interposed between the two scraper devices which are associated in the same stage may with advantage be a Belleville spring between the two hubs.

Moreover, in such an arrangement the arms carrying the scrapers of the two scraper devices in the same stage may be relatively angularly staggered in the direction of rotation, so that the chocolate mass which is to be processed, and which the scrapers remove from the cooling surfaces, can clear the arms of the scraper devices and be thoroughly and intensely mixed.

Another major advantage of the proposed conditioning machine is secured if the cooling stages are followed by a homogenising and holding stage. This permits temperature differentials within the conditioned mass to be equalised and a homogeneous distribution of the crystals in the mass to be achieved by affording time and opportunity for the low-melting crystals to melt and to transform themselves into higher melting crystal forms. This will be possible if the controlled temperature of the mass in the homogenising and holding stage is above the melting ranges of unstable crystal forms.

However, it is important to understand that the provision of such a homogenising and holding stage to follow the cooling stages will afford the same advantages if applied to conventional conditioning machines. In any case, this feature ensures a final product of high thermal stability and keeping power of the matured fats, besides dislaying a good glossy surface.

Preferably the homogenising and holding stage may consist of a chamber surmounting and communicating with the uppermost cooling stage and axially traversed by the drive shaft, said chamber containing rotating stirrer blades and peripheral scrapers.

BRIEF DESCRIPTION OF THE DRAWINGS

The thought which underlies the invention admits of diverse embodiments of which one will now be illustratively described with reference to the accompanying drawings in which FIG. 5 is a view from above of a scraper device in a cooling stage, FIG. 6 is a vertical section of the scraper device in a cooling stage, FIG. 7 is a section taken on the line VII—VII in FIG. 5, FIG. 8 is a section taken on the line VIII—VIII in FIG. 5, and FIGS. 9 and 10 are views of the scraper hubs.

DESCRIPTION OF PREFERRED EMBODIMENTS

Figure 1:
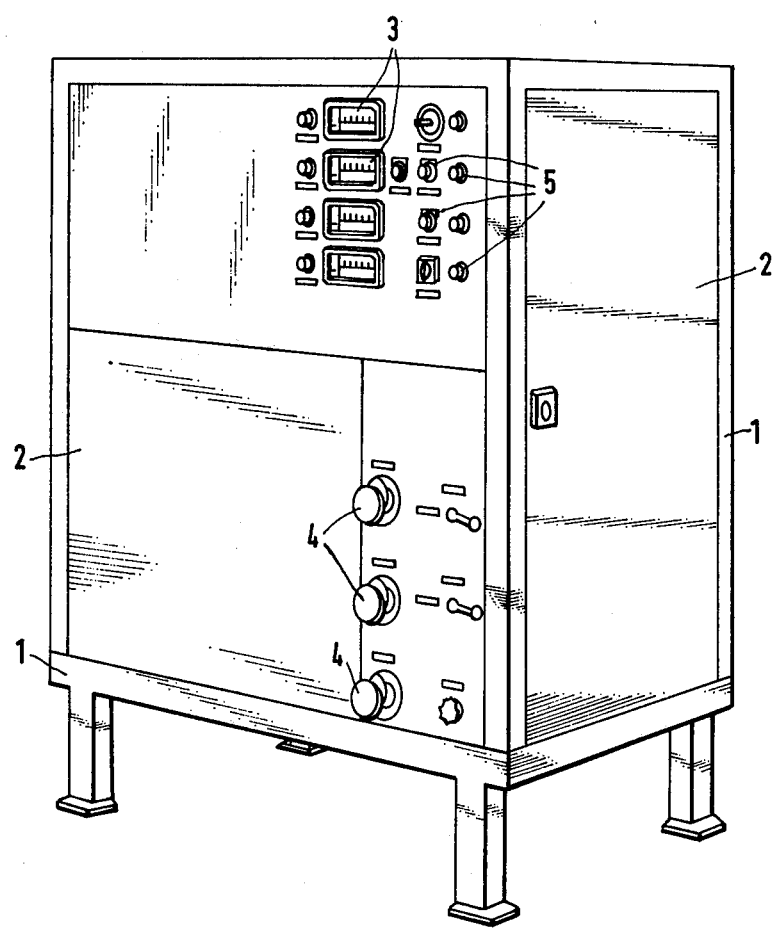
FIG. 1 is a perspective view of a machine completely enclosed in a casing.

The entire conditioning plant is accommodated in a machine frame 1 enclosed within an outer casing 2. The exterior of the casing 2 merely carries the measuring, controlling, regulating and adjusting instruments and equipment 3, 4 and 5. The conditioning part proper of the machine consists of circular cooling stages 6 placed one on the other with sealed intervening joints and thus forming an upright cylinder. Each cooling stage 6 in its interior contains a coolant chamber 7, the top of this chamber simultaneously defining one side of another chamber 8 for the mass. Near its circumference each cooling stage 6 contains an opening 9 for the passage therethrough of the mass. The cooling stages 6 are stacked in such a way that consecutive mass transfer openings 9 are on diametrically opposite sides. The bottom cooling stage 6 rests on a flat baseplate 10 containing an entry opening for the mass communicating with a mass supply pipe 12.

Where necessary the several mass transfer openings 9 are fitted with bushings 13 for the insertion of temperature sensors 14 or other control means that may be needed. The uppermost cooling stage 6 is surmounted by a cylindrical section 15 which contains cooling chambers 16 in its walls. This cylinder section 15 which is upwardly closed by a cover plate 17 encloses a chamber 18 which constitutes a homogenising and holding stage that will be later described. A pipe connection 19 provides communication between this chamber 18 and a mass delivery pipe.

Figure 2:
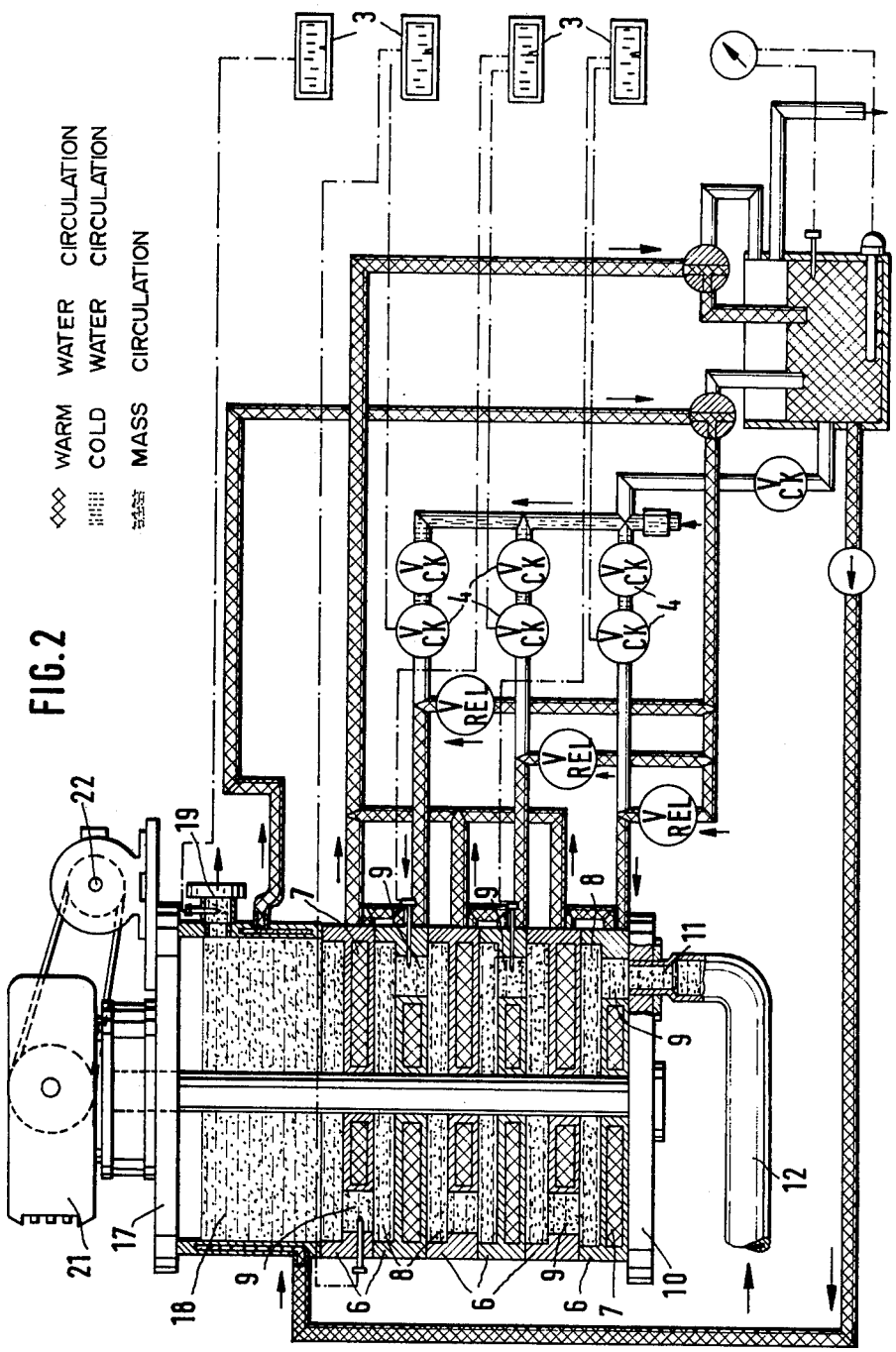
FIG. 2 is a schematic sectional view of the complete machine showing mass flow and water recirculation when "heating"
Figure 3:
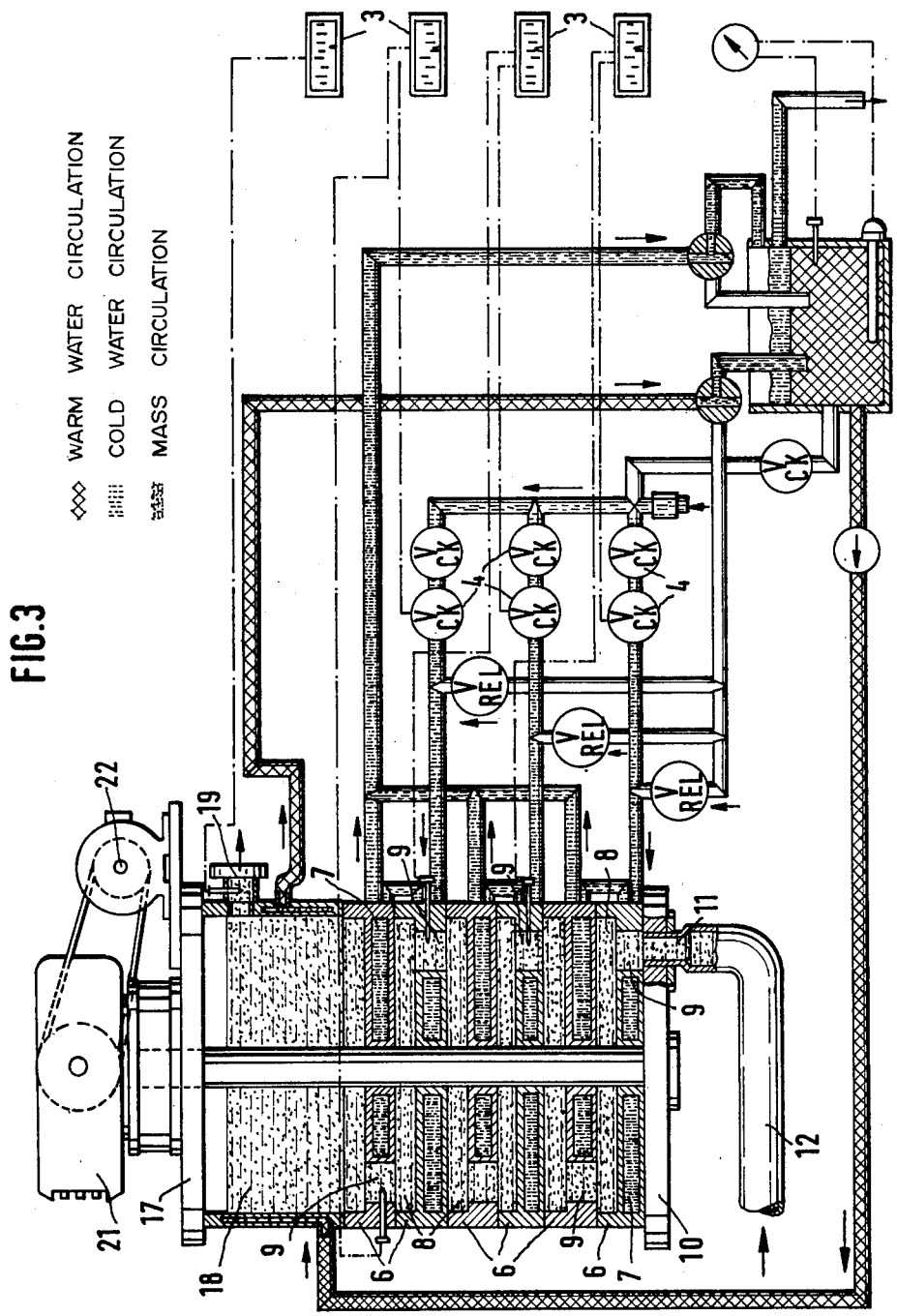
FIG. 3 is a similar view to that in FIG. 2 when "conditioning"

The stacked cooling stages are centrally traversed from top to bottom by a shaft 20 which serves to drive the scraper devices contained in each cooling stage. The shaft is itself driven by a motor 22 through gearing 21 mounted on the cover plate 17. All the cooling chambers are interconnected by pipe means and communicate with a recirculating system which is shown on the right hand side in FIGS. 2 and 3 and will not here be further discussed. The system is adapted to recirculate hot or cold water as may be required.

Figure 4:
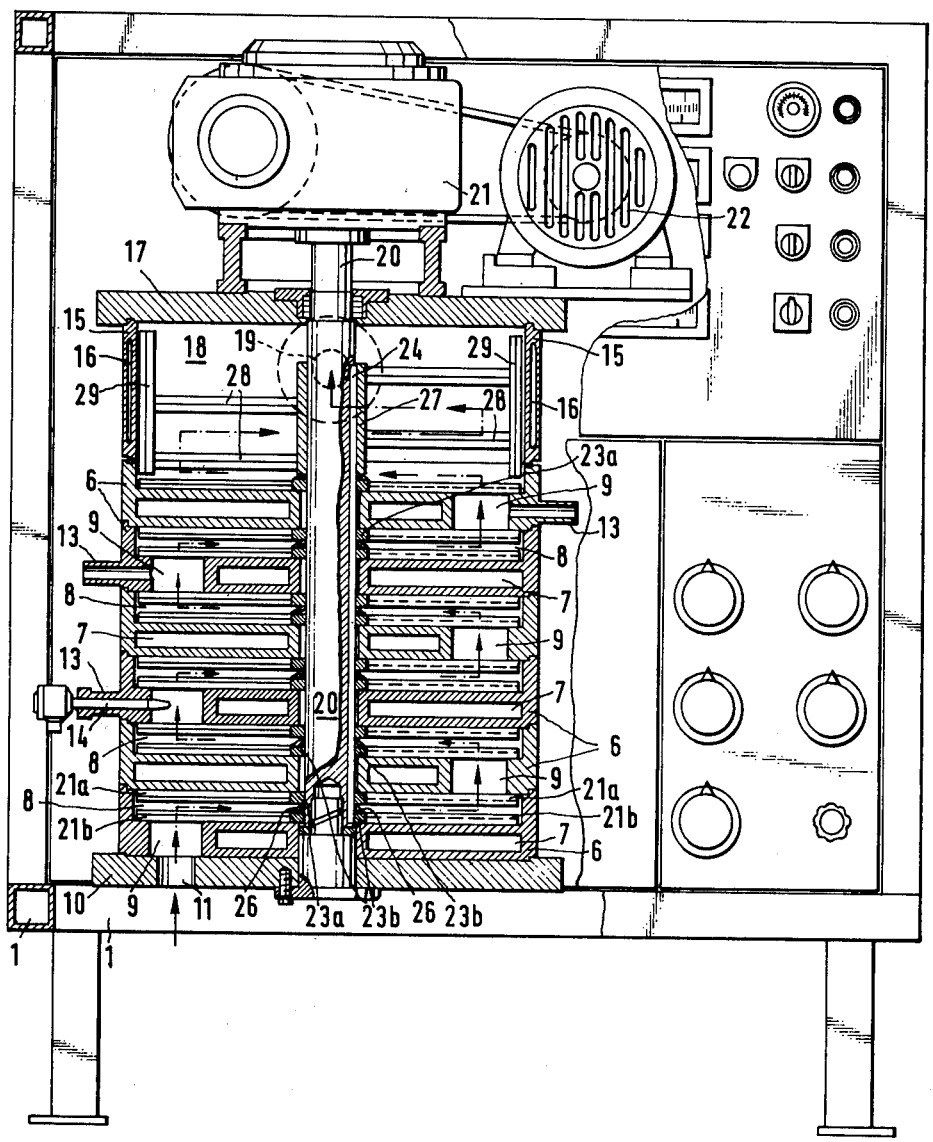
FIG. 4 is a sectional view of the conditioning machine on a larger scale.

During operation of the machine the mass that is to be conditioned is conveyed by means of a pump not shown in the drawings through the supply pipe 12 and the mass entry 11 from below in the direction of the arrow in FIG. 4 upwards through consecutive cooling stages in the stack and by contacting the cooling surfaces the mass is cooled in the manner desired.

Upon emerging from the top level cooling stage the mass enters chamber 18 whence it is conveyed through the outlet at 19 through a delivery pipe not shown to the processing machine. In this instance the cold and hot water recirculating system corresponds to the diagram in FIG. 3. During stoppages of the machine hot water is recirculated as indicated in the diagram according to FIG. 2. The performance of the force pump for the mass can be controlled according to the existing demand for the mass. On the other hand, electronic controls ensure accuracy of temperature levels as is necessary for a satisfactory conditioning of the mass.

According to the invention scrapers are provided in the mass chamber 8 in every cooling stage 6. The scrapers scrape the top and bottom of each chamber 8 and detach the cooling chocolate mass from these surfaces. The scrapers are attached to rotors which can be driven by shaft 20. In the illustrated embodiment rotors 23a and 23b, each carrying four arms 22a and 22b which have modified edges forming scrapers 21a and 21b are provided. The rotors in the illustrated form of construction are square contoured hubs axially slidably mounted on the drive shaft 20 and held by slot 25 and key 24. The scrapers which sweep the top of each chamber are marked 21a, their arms 22a and their hubs 23a. On the other hand, the scraper devices which sweep the bottom of each chamber 8 are marked 21b, 22b and 23b. By reference to FIGS. 9 and 10 it will be understood that the slots 25 in the hubs 23a are placed at an angle of 45° to the slots 25 in the hubs 23b. Consequently the arms 22a will also be angularly staggered at an angle of 45° in relation to the arms 22b of the associated scraper device. Owing to this angular stagger there is adequate space above the back of each arm to permit the mass to flow over the rotating scraper arms.

Close contact between the scrapers and the swept cooling surfaces is achieved by the provision of dish springs between the two rotors 23a and 23b in the same conditioning chamber as the springs urging the rotors axially apart. The uppermost element 6 also forms the bottom of chamber 18. In this stage there is naturally only one scraper rotor 23b. Above this rotor and with the interposition of a pair of dish springs 26 a sleeve 27 is mounted on shaft 20. The sleeve which is likewise secured by slot and key carries radial arms 28 forming terminal scraper blades 29 or the like which sweep around the internal circumference of the wall 15. They also perform the additional function of continuously stirring the mass entering chamber 18 and mixing the same.

This homogenising and holding stage constituted by chamber 18 is designed for a residence time of about two minutes and ensures a thorough commixture of the precrystallised mass at a slightly raised temperature. Temperature differences within the mass are thus equalised and a homogeneous dispersal of the crystals in the mass achieved. On the other hand, the low melting crystals have time and opportunity to melt and to transform themselves into higher melting crystal forms.

By the use of several cooling stages surmounted by a homogenising and holding stage it is possible in conjuntion with the associated recirculating heating and cooling system to achieve a specific temperature change of the mass as it passes through the machine. For instance, the machine can be so controlled that there is intense cooling in a region in which no crystals as yet form, and gentle cooling and extended residence in a stage where crystal formation takes place.

Generally speaking the large overall cooling surface provides a considerable capacitive reserve as well as a gentle cooling treatment. The rated throughput of the machine is achieved by recirculating cooling water at a temperature of 16° C. The consequent high temperature of the cooling surface ensures that there is a high proportion of high melting stable crystals. Owing to the continuous scraping of the cooling surfaces and the intense mixing effect on the detached mass, only the tiniest crystals, i.e. microcrystals, can form on the cooling surfaces. The simultaneous and subsequent intense commixture then ensures that the precrystallised mass will contain a large number of microcrystals as seed crystals in homogeneous distribution.

What is claimed is:

1. In a conditioning machine for chocolate masses, the machine comprising a stack of cooling stages forming a cylinder, each having cooled top and bottom walls connected to a coolant recirculating system, a pump forcing the mass through all the stages, each stage containing scrapers revolving about the cylinder axis for continuously detaching the mass from the cooling surfaces, the improvement wherein each stage contains two rotating scraper devices which are urged axially apart by an interposed spring, and which are provided with scrapers sweeping top and bottom surfaces of their associated one stage of said plurality of stages, said rotating scraper devices comprising arms radiating from a hub mounted on a drive shaft, each arm carrying or forming a scraper, wherein said hubs of the scraper devices are axially slidable on the drive shaft and wherein the respective spring of each stage is interposed between hubs of two scraper devices associated with the same stage.

2. A conditioning machine according to claim 1, wherein the arms carrying the scrapers of the two scraper devices associated in the same stage are relatively angularly staggered in the direction of rotation.

3. A conditioning machine, particularly according to claim 1, wherein the cooling stages are followed by a homogenising and holding stage.

4. A conditioning machine according to claim 3, wherein the homogenising and holding stage is formed by a chamber surmounting and communicating with the uppermost cooling stage and traversed by the drive shaft, said chamber containing rotating stirring arms and peripheral scrapers.

* * * * *